United States Patent
Day et al.

(10) Patent No.: US 8,638,112 B2
(45) Date of Patent: Jan. 28, 2014

(54) INPUT DEVICE BASED ON VOLTAGE GRADIENTS

(75) Inventors: Shawn P. Day, San Jose, CA (US); Patrick Worfolk, Campbell, CA (US)

(73) Assignee: Synaptics Incorporated, San Jose, CA (US)

( * ) Notice: Subject to any disclaimer, the term of this patent is extended or adjusted under 35 U.S.C. 154(b) by 414 days.

(21) Appl. No.: 12/879,474

(22) Filed: Sep. 10, 2010

(65) Prior Publication Data

US 2011/0062974 A1 Mar. 17, 2011

Related U.S. Application Data

(60) Provisional application No. 61/241,692, filed on Sep. 11, 2009, provisional application No. 61/350,727, filed on Jun. 2, 2010.

(51) Int. Cl.
*G01R 27/28* (2006.01)

(52) U.S. Cl.
USPC . 324/713; 324/519; 324/750.17; 324/754.28; 324/658; 345/173; 345/174; 178/18.06; 178/18.03

(58) Field of Classification Search
USPC .......................... 324/658, 660, 661, 686, 713
See application file for complete search history.

(56) References Cited

U.S. PATENT DOCUMENTS

| | | | |
|---|---|---|---|
| 4,087,625 A | 5/1978 | Dym et al. | |
| 5,650,597 A | 7/1997 | Redmayne | |
| 5,841,078 A | 11/1998 | Miller et al. | |
| 6,278,444 B1 * | 8/2001 | Wilson et al. | 345/173 |
| 6,288,707 B1 | 9/2001 | Philipp | |
| 6,879,930 B2 | 4/2005 | Sinclair et al. | |
| 7,030,860 B1 | 4/2006 | Hsu et al. | |
| 7,265,686 B2 | 9/2007 | Hurst | |
| 7,355,592 B2 * | 4/2008 | Hong et al. | 345/173 |
| 7,382,139 B2 | 6/2008 | Mackey | |

(Continued)

FOREIGN PATENT DOCUMENTS

EP 2045698 4/2009

OTHER PUBLICATIONS

United States Patent and Trademark Office, Non-Final Office Action mailed Sep. 6, 2012 for U.S. Appl. No. 12/847,598.

(Continued)

*Primary Examiner* — Arleen M Vazquez
*Assistant Examiner* — Thang Le
(74) *Attorney, Agent, or Firm* — Ingrassia Fisher & Lorenz P.C.

(57) ABSTRACT

An input device is disclosed, including a first drive electrode comprising a resistive material and a first sense electrode disposed proximate to the first drive electrode. The input device further includes a processing system which is coupled with the first drive electrode and the first sense electrode. In one embodiment, the processing system is configured for electrically driving a first end of the first drive electrode and electrically driving a second end of the first drive electrode to cause a change in a voltage gradient along a length of the first drive electrode. In such an embodiment, the change in the voltage gradient generates a first electrical signal in the first sense electrode. The processing system also acquires a first measurement of the first electrical signal and determines positional information along the length of the first drive electrode based upon the first measurement, wherein the positional information is related to an input object.

27 Claims, 18 Drawing Sheets

(56) References Cited

U.S. PATENT DOCUMENTS

| | | |
|---|---|---|
| 7,423,635 B2 | 9/2008 | Taylor et al. |
| 7,737,953 B2 | 6/2010 | Mackey |
| 8,059,103 B2 * | 11/2011 | Geaghan .................... 345/173 |
| 2004/0135775 A1 | 7/2004 | Hurst et al. |
| 2005/0012644 A1 | 1/2005 | Hurst et al. |
| 2006/0097991 A1 | 5/2006 | Hotelling et al. |
| 2007/0146349 A1 | 6/2007 | Errico |
| 2007/0222763 A1 * | 9/2007 | Spath ......................... 345/173 |
| 2007/0247443 A1 | 10/2007 | Philipp |
| 2007/0257894 A1 | 11/2007 | Philipp |
| 2008/0006453 A1 | 1/2008 | Hotelling |
| 2008/0246496 A1 * | 10/2008 | Hristov et al. ............... 324/686 |
| 2009/0091551 A1 | 4/2009 | Hotelling et al. |
| 2009/0127003 A1 * | 5/2009 | Geaghan .................. 178/18.03 |
| 2009/0194344 A1 | 8/2009 | Harley et al. |
| 2009/0267914 A1 * | 10/2009 | Dews et al. ................. 345/173 |
| 2009/0277696 A1 | 11/2009 | Reynolds et al. |
| 2009/0322355 A1 | 12/2009 | Day et al. |
| 2009/0322700 A1 * | 12/2009 | D'Souza et al. .............. 345/174 |
| 2009/0322701 A1 * | 12/2009 | D'Souza et al. .............. 345/174 |
| 2010/0007625 A1 * | 1/2010 | Jiang et al. ................... 345/173 |
| 2010/0045632 A1 * | 2/2010 | Yilmaz et al. ................ 345/174 |
| 2010/0164889 A1 | 7/2010 | Hristov et al. |
| 2010/0214231 A1 * | 8/2010 | D'Souza et al. .............. 345/173 |
| 2010/0258360 A1 * | 10/2010 | Yilmaz ..................... 178/18.06 |
| 2010/0328255 A1 | 12/2010 | Ishizaki et al. |
| 2011/0043478 A1 * | 2/2011 | Matsushima ................ 345/174 |
| 2011/0048813 A1 * | 3/2011 | Yilmaz ..................... 178/18.06 |
| 2011/0062969 A1 | 3/2011 | Hargreaves et al. |
| 2011/0062974 A1 | 3/2011 | Day |

OTHER PUBLICATIONS

ISA/KR, International Search Report and Written Opinion for International Application No. PCT/US2010/048319, 11 pages, Apr. 28, 2011.

* cited by examiner

900A

```
DRIVING A FIRST AND SECOND END OF A DRIVE ELECTRODE TO
CAUSE A CHANGE IN A VOLTAGE GRADIENT ALONG THE LENGTH
OF THE DRIVE ELECTRODE; GENERATING A FIRST ELECTRICAL
SIGNAL IN A SENSE ELECTRODE
910
```

↓

```
ACQUIRE A FIRST MEASUREMENT OF THE FIRST ELECTRICAL
SIGNAL
920
```

↓

```
DETERMINE POSITIONAL INFORMATION ALONG THE LENGTH OF
THE DRIVE ELECTRODE BASED UPON THE FIRST MEASUREMENT,
THE POSITIONAL INFORMATION RELATED TO AN INPUT OBJECT
930
```

DRIVING A FIRST AND SECOND END OF A DRIVE ELECTRODE TO CAUSE A CHANGE IN A VOLTAGE GRADIENT ALONG THE LENGTH OF THE DRIVE ELECTRODE; GENERATING A FIRST ELECTRICAL SIGNAL IN A SENSE ELECTRODE
910

↓

ACQUIRE A FIRST MEASUREMENT OF THE FIRST ELECTRICAL SIGNAL
920

↓

DRIVING AT LEAST ONE OF THE FIRST AND SECOND ENDS OF THE DRIVE ELECTRODE TO GENERATE A SECOND ELECTRICAL SIGNAL IN THE SENSE ELECTRODE
940

↓

ACQUIRE A SECOND MEASUREMENT, THE SECOND MEASUREMENT BEING OF THE SECOND ELECTRICAL SIGNAL
950

↓

DETERMINE POSITIONAL INFORMATION ALONG THE LENGTH OF THE DRIVE ELECTRODE BASED UPON THE FIRST MEASUREMENT AND THE SECOND MEASUREMENT, THE POSITIONAL INFORMATION RELATED TO AN INPUT OBJECT
960

FIG. 9B

INPUT DEVICE BASED ON VOLTAGE GRADIENTS

RELATED U.S. APPLICATIONS (PRIORITY CLAIM)

This application claims priority to the co-pending provisional patent application, Ser. No. 61/241,692, entitled "SINGLE LAYER CAPACITANCE IMAGING SENSOR," with filing date Sep. 11, 2009, and assigned to the assignee of the present invention, which is herein incorporated by reference in its entirety.

This application claims priority to the co-pending provisional patent application, Ser. No. 61/350,727, entitled "POSITION SENSING WITH A GRADIENT SENSOR," with filing date Jun. 2, 2010, and assigned to the assignee of the present invention, which is herein incorporated by reference in its entirety.

RELATED U.S. APPLICATIONS (CROSS-REFERENCE)

This Application is related to U.S. patent application Ser. No. 12/815,662, entitled "SINGLE LAYER CAPACITIVE IMAGE SENSING," by Hargreaves et al., with filing date Jun. 15, 2010, and assigned to the assignee of the present invention.

This Application is related to U.S. patent application Ser. No. 12/847,598, entitled "SINGLE LAYER TRANSCAPACITIVE SENSING," by Badaye, with filing date Jul. 30, 2010, and assigned to the assignee of the present invention.

BACKGROUND

Capacitive sensing is a key technology in the implementation of sophisticated modern human-machine interfaces. Capacitive sensing can involve sensing the proximity, contact, and/or position of an input object such as a human finger, a stylus, or some other object. Often, capacitive sensing devices are based on the measurement of mutual capacitance, which is also sometimes known as transcapacitance.

BRIEF DESCRIPTION OF THE DRAWINGS

The accompanying drawings, which are incorporated in and form a part of the Description of Embodiments, illustrate various embodiments of the present invention and, together with the Description of Embodiments, serve to explain principles discussed below. The drawings referred to in this Brief Description of Drawings should not be understood as being drawn to scale unless specifically noted.

FIGS. 9A and 9B illustrate a flow diagram of some example methods of position sensing, according to various embodiments.

DESCRIPTION OF EMBODIMENTS

Reference will now be made in detail to various embodiments of the subject matter, examples of which are illustrated in the accompanying drawings. While various embodiments are discussed herein, it will be understood that the scope of the invention is not intended to be limited to these embodiments. On the contrary, the scope of the invention is intended to cover alternatives, modifications and equivalents that may be included within the spirit and scope of the various embodiments. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail in order to avoid unnecessarily obscuring aspects of the described embodiments.

Overview of Discussion

The discussion will begin with a description of an example input device. The input device includes a sensor, which itself includes one or more sensor electrodes. Several non-inclusive example configurations of sensors and their corresponding sensor electrode arrangements will be described. As will be explained herein, operation of the input device is based upon the establishment of a voltage gradient along or across one or more sensor electrodes. Operation of the input device will be described in detail in conjunction with descriptions of some example methods of position sensing, according to various embodiments.

Example Input Device

Figure 1:
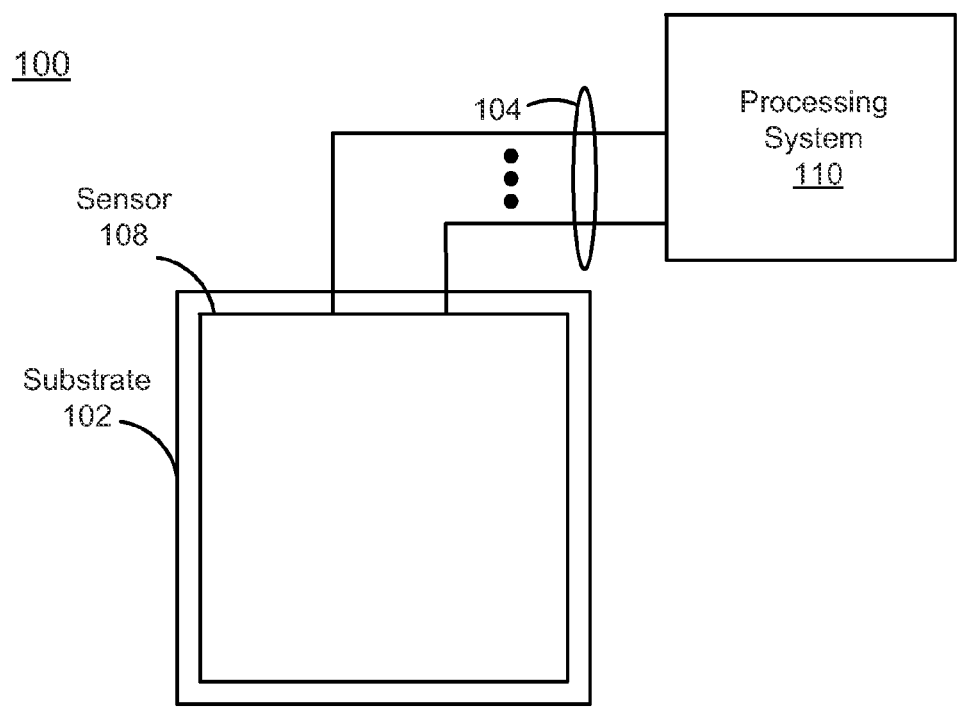
FIG. 1 is a block diagram of an example input device 100 representing an embodiment of the invention.

FIG. 1 is a block diagram of an input device 100 representing an example embodiment of the present invention. The input device 100 may be configured to provide input to an electronic system (not shown). As used in this document, "electronic system" (also "electronic device") broadly refers to any system capable of electronically processing information. Some non-limiting examples of electronic systems include personal computers of all sizes and shapes, such as desktop computers, laptop computers, tablets, web browsers, book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines. Other examples include communication devices (including cellular phones such as smart phones), and media devices (including recorders, editors, and players such as televisions, set top boxes, music players, digital photo frames, and digital cameras). Additionally, the electronic system could be a host or a slave to the input device.

The input device 100 can be implemented as a physical part of the electronic system, or be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA Input device 100 comprises substrate 102, sensor 108, conductive routing traces 104, and processing system 110. Sensor 108 further comprises sensor electrodes (not shown), and the conductive routing traces 104 serve to electrically couple the processing system 110 with the sensor electrodes. In some of the following embodiments, conductive routing traces 104 may also be referred to as routing traces 104, or routing traces 104 may be referred to as composing a communicative coupling between processing system 110 and sensor 108. In embodiments described herein, conductive routing traces 104 comprise various combinations of conductive routing traces $D_{L0}$, $D_{L1}$, $D_{L2}$, etc., conductive routing traces $D_{R0}$, $D_{R1}$, $D_{R2}$, etc., conductive routing traces $S_{X0}$, $S_{X1}$, $S_{X2}$, etc. and conductive routing traces $D_{RCOM}$ and $D_{LCOM}$. The particular combination of conductive routing traces composing a particular embodiment will be described in conjunction with that embodiment. Further, in some of the following embodiments, conductive routing traces 104 may be referred to as composing a communicative coupling between processing system 110 and sensor 108.

In FIG. 1, a processing system (or "processor") 110 is shown as part of the input device 100. The processing system 110 is configured to operate the hardware of the input device 100 to detect input objects in a sensing region of sensor 108. The processing system 110 may comprise parts of or all of one or more integrated circuits (ICs) or other hardware; and, in some embodiments, the processing system 110 also comprises firmware code, software code, and/or the like. In some embodiments, components comprising the processing system 110 are located together, such as near the sensor 108 of the input device 100. In other embodiments, components of processing system 110 are physically separated, with one or more components close to sensor 108 of input device 100 and one or more components elsewhere. For example, the input device 100 may be peripheral to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to input objects (or lack of input objects) in the sensing region directly by causing actions. Example actions include changing operation modes, as well as GUI actions such as cursor movement, selection, menu navigation, and other functions. In some embodiments, the processing system 110 provides information about the input objects (or lack of input objects) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensor 108 of the input device 100 to produce electrical signals indicative of input objects (or lack of input objects) in the sensing region. The processing system 110 may perform any appropriate amount of processing on the electrical signals in producing the information provided to the electronic system. For example, the processing system 110 may merely digitize the electrical signals. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine "positional information," recognize motion of input objects as commands, recognize handwriting, and the like.

In operation, sensor 108 defines a sensing region for sensing input objects. The term "sensing region" as used herein is intended to broadly encompass any space above, around, in and/or near the sensor wherein the sensor is able to detect an input object. In a conventional embodiment, a sensing region extends from a surface of the sensor in one or more directions into space until the distance between the object and the sensor prevents accurate detection. This distance may be on the order of less than a millimeter, millimeters, centimeters, or more, and may vary significantly with the type of position sensing technology used and the accuracy desired. Accordingly, the planarity, size, shape and exact locations of the particular sensing regions can vary widely from embodiment to embodiment.

Sensing regions with a generally rectangular projected shape are common, although many other shapes are possible.

For example, depending on the design of the sensor electrodes and surrounding components, sensing regions can be made to have two-dimensional projections of other shapes. Similar approaches can be used to define the three-dimensional shape of the sensing region. For example, any combination of sensor design, shielding, signal manipulation, and the like can effectively define a three-dimensional sensing region. Although sensor 108 is depicted as rectangular, other shapes, such as circular, are anticipated.

In FIG. 1, a capacitive sensing reference surface or "cover layer" is not illustrated over sensor 108, so as not to obscure other portions which are being discussed. However, it is appreciated that such a capacitive sensing reference surface, which may be made of a clear material, typically prevents input objects from coming into direct contact with the sensor electrodes composing sensor 108.

In operation, processing system 110 acquires one or more capacitance measurements related to the sensor electrodes composing sensor 108. These capacitance measurements enable the sensing of input objects with respect to the sensing region formed by sensor 108. In some embodiments, such measurements can be utilized by processing system 110 to determine input object positional information relative to the sensing region formed by sensor 108.

The positional information determined by processing system 110 can be any suitable indicia of object presence. For example, the processing system can be implemented to determine "zero-dimensional" positional information (e.g. near/far or contact/no contact) or "one-dimensional" positional information as a scalar (e.g. position or motion along a sensing region). Processing system 110 can also be implemented to determine multi-dimensional positional information as a combination of values (e.g. two-dimensional horizontal/vertical axes, three-dimensional horizontal/vertical/depth axes, angular/radial axes, or any other combination of axes that span multiple dimensions), and the like. Processing system 110 can also be implemented to determine information about time or history.

Furthermore, the term "positional information" as used herein is intended to broadly encompass absolute and relative position-type information, and also other types of spatial-domain information such as velocity, acceleration, and the like, including measurement of motion in one or more directions. Various forms of positional information may also include time history components, as in the case of gesture recognition and the like. The positional information from the processing system 110 facilitates a full range of interface inputs, including use of the input device as a pointing device for cursor control, scrolling, and other functions.

In some embodiments, the input device 100 is implemented with additional input components that are operated by the processing system 110 or by some other processing system. These additional input components may provide redundant functionality for input in the sensing region, or to provide some other functionality. Buttons are one example of additional input components that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region overlaps at least part of an active area of a display screen. For example, input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are to be described here in the context of a fully functioning apparatus, some mechanisms of the present invention are capable of being distributed as a program product (e.g., software) in a variety of forms. For example, some mechanisms of the present invention may be implemented and distributed as a software program on information bearing media that is readable by electronic processors (e.g., non-transitory computer-readable and/or recordable/writable information bearing media that is readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

It is noted that some example embodiments of sensor electrode patterns composing sensor 108 are described herein and shown in FIGS. 2A-8. It is appreciated that these descriptions and FIGS. 2A-8 are provided by way of example and not of limitation. In general, other zero-dimensional, one-dimensional, or two-dimensional capacitive sensor electrode patterns that follow the principles described herein can also be used. These include sensors comprising single layer or multilayer sensor electrode patterns.

EXAMPLE SENSOR DESIGNS

I. Single-Axis Gradient Sensors

Figure 2A:
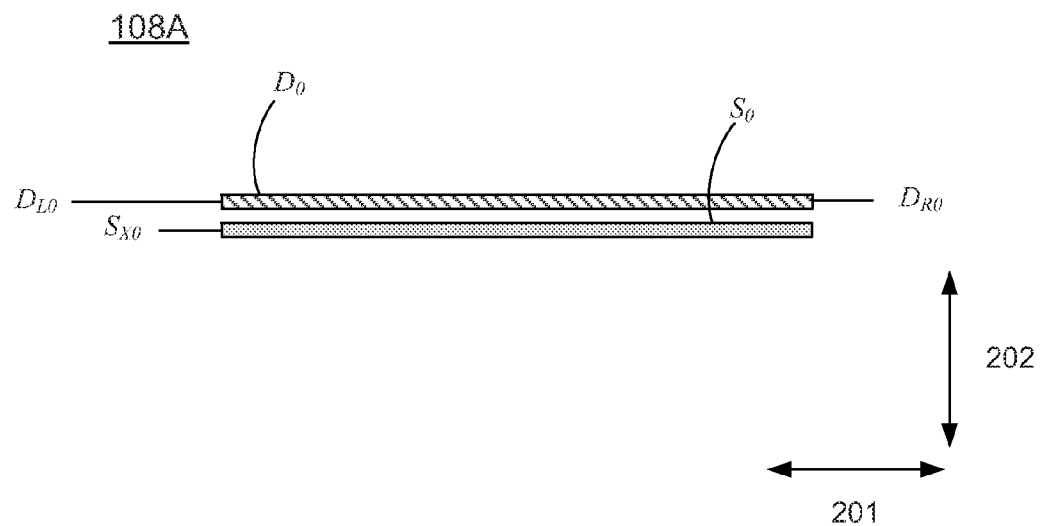
FIG. 2A illustrates a top view of a sensor 108A of an input device, according to an embodiment.
Figure 2B:
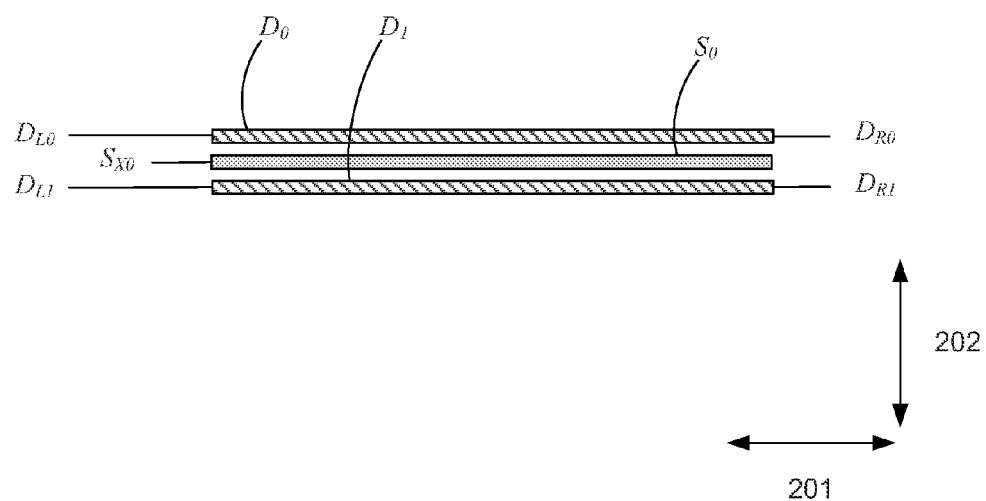
FIG. 2B illustrates a top view of a sensor 108B of an input device, according to an embodiment.
Figure 3A:
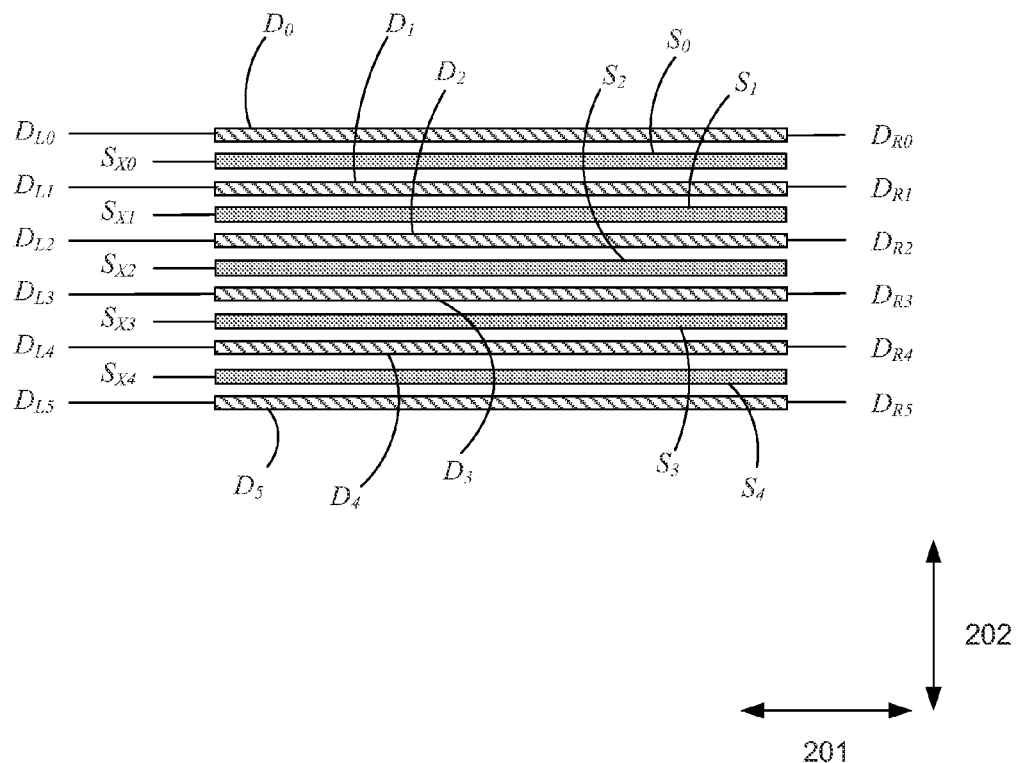
FIG. 3A illustrates a top view of a sensor 108E of an input device, according to an embodiment.

FIG. 2A illustrates a top view of a sensor 108A, according to an embodiment. Sensor 108A represents an example of a sensor 108 in input device 100 of FIG. 1. As illustrated, sensor 108A includes two sensor electrodes ($D_0$ and $S_0$), one of which is designated as a drive electrode ($D_0$) and the other of which is designated as a sense electrode ($S_0$). The drive electrode $D_0$ is electrically conductive, but has a non-zero resistivity. During operation, the non-zero resistivity allows a voltage gradient to be established along the length of the drive electrode. In one embodiment, the non-zero resistivity is substantially uniform along the length of the drive electrode. Conductive routing trace $D_{L0}$ couples processing system 110 to the left end of drive electrode $D_0$, and conductive routing trace $D_{R0}$ couples processing system 110 to the right end of drive electrode $D_0$. Conductive routing trace $S_{X0}$ couples processing system 110 to sense electrode $S_0$. It is appreciated that other embodiments of sensor 108A can include a greater number of sensor electrodes. For example, FIG. 2B illustrates an embodiment with a greater number of drive electrodes, and FIG. 3A illustrates an embodiment with a greater number of drive electrodes and a greater number of sense electrodes.

As illustrated in FIG. 2A, drive electrode $D_0$ of sensor 108A is elongated along axis 201 (e.g., an X-axis of a Cartesian coordinate system). Sense electrode $S_0$ of sensor 108A is disposed proximate to drive electrode $D_0$. In the illustrated embodiment, sense electrode $S_0$ is disposed substantially parallel to drive electrode $D_0$. It is appreciated that while the following description may refer to methods for determining the position of an input object along an X-axis and Y-axis of a Cartesian coordinate system, the axes are used only as examples and the axes may be reversed, or other coordinate systems may be used.

Even though the sensor electrodes are illustrated as being substantially rectilinear, many other shapes are possible. For example, nonlinear shapes may be used. Further, in some embodiments, the width of a sensor electrode may vary along its length. In other embodiments, one or more sides of a sensor electrode may be curved. In further embodiments, the sensor electrodes may be shaped to affect the capacitive coupling between pairs of drive and sense electrodes. In yet other embodiments, the resistivity, width, depth or thickness of a sensor electrode may also be varied to change its conductance. In various embodiments, the sensor electrodes may be shaped based on the desired shape of sensor 108. In some embodiments any two sensor electrodes may extend for different lengths along a common axis. In further embodiments, the sensor electrodes may be shaped based on one or more of the characteristics of input device 100.

In some embodiments, sensor 108A is constructed as a single-layer sensor, meaning that drive electrode $D_0$ and sense electrode $S_0$ are disposed in the same layer on substrate 102. In other embodiments, drive electrode $D_0$ and sense electrode $S_0$ may be disposed in different layers on substrate 102 without altering the general operation of sensor 108A. In various embodiments, manufacturing costs related to a single-layer sensor design may be lower than manufacturing costs related to a sensor design having more layers. In other embodiments, drive electrode $D_0$ and sense electrode $S_0$ may be disposed on different substrates. In one embodiment, processing system 110 may be configured to operate as a one-dimensional input device when coupled with sensor 108A. In other embodiments, sensor 108A may be part of a larger sensor, such as sensor 108E of FIG. 3A.

In one embodiment, the sensor electrodes $D_0$ and $S_0$ in sensor 108A can be constructed from transparent conductive material, such as patterned ITO, ATO, carbon fiber nanotubes or other substantially transparent materials disposed on a transparent substrate (e.g., substrate 102). In such an embodiment, the transparent electrodes and substrate result in a transparent touch sensor that may be used in touch screen applications. In one embodiment, drive electrode $D_0$ is further constructed from a conductive material of substantially uniform resistivity, so that uniform left-to-right voltage gradients can be imposed on it by the driving methods described below. In some embodiments, in sensor 108A (and other sensors 108 described herein) the conductive material may have non-uniform resistivity, such as having a higher or lower resistivity on the distal ends than in the middle portion. Other forms of non-uniform resistivity can also be accommodated.

In general, a voltage gradient may be defined as the amount of change in voltage as a function of a small change in position along a resistive electrode such as $D_0$. For a drive electrode driven by voltages at two points, the voltage will be monotonic along the length of the electrode between those two points. Therefore, the voltage gradient will be either positive along the length of the electrode between the two points, negative along the length of the electrode between the two points, or zero along the length of the electrode between the two points. With continued reference to FIG. 2A, in various embodiments processing system 110 can create voltage gradients along the drive electrode $D_0$ by driving a current through it, or by driving voltages onto $D_{L0}$ and $D_{R0}$. In one embodiment, when drive electrode $D_0$ comprises a substantially uniform width, thickness, and resistivity along its length, the voltage gradient will be a constant value along the length of the drive electrode $D_0$. In such a case, the voltage gradient can be defined as the difference in voltage between $D_{L0}$ and $D_{R0}$, divided by the length of the drive electrode. Note that in this case the voltage gradient is a signed value, and it can be positive, negative, or zero. Changing each of the voltages on $D_{L0}$ and $D_{R0}$ by substantially the same amount changes the absolute voltage on drive electrode $D_0$ with respect to an external reference such as the voltage on sense electrode $S_0$, but it does not substantially change the voltage gradient since the difference between the voltages remains substantially constant.

In one embodiment, processing system 110 drives a voltage $V_{L0}$ onto $D_{L0}$ and a voltage $V_{R0}$ onto $D_{R0}$. When drive electrode $D_0$ has substantially uniform width, thickness, and resistivity, then the voltage at any point along its length will be given by equation 1:

$$V(x) = V_{L0} + (V_{R0} - V_{L0})x \qquad \text{Equation 1}$$

In equation 1, x represents the position along drive electrode $D_0$, with x=0 representing its left end and x=1 representing its right end, and V(x) represents the voltage on drive electrode $D_0$ at position x, thus defining a first voltage gradient along drive electrode $D_0$.

Subsequently, processing system 110 can drive potentially different voltages $V'_{L0}$ onto $D_{L0}$ and $V'_{R0}$ onto $D_{R0}$. The voltage at any point along the drive electrode $D_0$ will then be given by equation 2:

$$V'(x) = V'_{L0} + (V'_{R0} - V'_{L0})x \qquad \text{Equation 2}$$

In equation 2, x is defined as above and V'(x) represents the new voltage on drive electrode $D_0$ at position x, thus defining a second voltage gradient along drive electrode $D_0$.

As a result of this change in drive voltages, from $V_{L0}$ to $V'_{L0}$ on $D_{L0}$ and from $V_{R0}$ to $V'_{R0}$ on $D_{R0}$, the change in voltage along drive electrode $D_0$ will be given by $\delta V(x)$ as shown in equation 3:

$$\delta V(x) = V'(x) - V(x) = \delta V_{L0} + (\delta V_{R0} - \delta V_{L0})x \qquad \text{Equation 3}$$

In equation 3, x is defined as above, $\delta V_{L0}$ is the change in voltage driven by processing system 110 onto $D_{L0}$ (i.e. $V'_{L0} - V_{L0}$), and $\delta V_{R0}$ is the change in voltage driven by processing system 110 onto $D_{R0}$ (i.e. $V'_{R0} - V_{R0}$).

In response to the changing voltage $\delta V(x)$ along the length of drive electrode $D_0$, an electrical signal (i.e. sense signal) will be generated on sense electrode $S_0$ due to capacitive coupling (or transcapacitance) between the drive electrode $D_0$ and the sense electrode $S_0$. Herein, the terms "generate" and "generated" are applied in their common usage, meaning "to bring into being" and "brought into being", as opposed to any more specific electrical engineering definitions. The sign and magnitude of the sense signal depends on $\delta V(x)$ along the length of $D_0$, and on the distributed capacitive coupling between $D_0$ and $S_0$ along their lengths. Further, in various embodiments, the sense signal can be measured by processing system 110.

In one embodiment, when no finger or other input object is present in the sensing region of sensor 108A, the measurement S of the sense signal on sense electrode $S_0$ is proportional to the integral along the length of the electrode of the distributed capacitive coupling C(x) multiplied by the distributed change in voltage $\delta V(x)$. In some embodiments, when the spacing between the drive and sense electrodes is substantially uniform along their lengths, then the distributed capacitive coupling between them will also be substantially uniform along their lengths. In such embodiments, the measurement S of the sense signal is approximated by:

$$S = K\,C(\delta V_{R0} + \delta V_{L0})/2 \qquad \text{Equation 4}$$

where K is a proportionality constant and C represents the total capacitive coupling between the drive and sense electrodes along their lengths.

In various embodiments, the measurement S may represent a baseline measurement with no input object present. When a finger or other input object approaches the sensor, it changes the capacitive coupling between $D_0$ and $S_0$ in the region near the input object and a second measurement S' of the sense signal can be acquired as described above, driving the drive electrode in the same way. The total change in capacitive coupling due to the input object can be represented by $\Delta C$, and the change $\Delta S$ in the measurement of the sense signal with respect to the baseline measurement is given by:

$$\Delta S = S' - S = K\,\Delta C\,\delta V(x_0) \qquad \text{Equation 5}$$

where $x_0$ represents the centroid (i.e. the representative X-position along axis 201) of the capacitive influence of the input object, and $\delta V(x_{L0})$ is given by equation 3. Substituting equation 3 into equation 5 gives equation 6:

$$\Delta S = K\,\Delta C[\delta V_{L0} + (\delta V_{R0} - \delta V_{L0})x_0] \qquad \text{Equation 6}$$

By controlling $\delta V_{L0}$ and $\delta V_{R0}$ to take two independent measurements of $\Delta S$, both the position of the input object ($x_0$) and the magnitude of its influence ($\Delta C$) can be determined by processing system 110.

In the embodiment described above, the baseline value S is determined from a measurement of a sense signal when no input object is present in the sensing region. In other embodiments, the baseline value may be a predetermined value.

In one embodiment, a first measurement can be obtained by driving both ends of drive electrode $D_0$ (i.e. $D_{L0}$ and $D_{R0}$) with the same voltage change $\delta V_0$ so that equation 6 simplifies to equation 7:

$$\Delta S_1 = K\,\Delta C\,\delta V_0 \qquad \text{Equation 7}$$

Equation 7 yields $\Delta C$ from known or measured quantities. In one embodiment, driving both ends of drive electrode $D_0$ with the same voltage change can be accomplished by driving both $D_{L0}$ and $D_{R0}$ with the same voltage waveform. In another embodiment, driving both ends of drive electrode $D_0$ with the same voltage change can be accomplished by driving one end with a voltage waveform and leaving the other end electrically disconnected or in a high impedance state.

In one embodiment, once $\Delta C$ is known, the first and second routing traces (i.e. $D_{L0}$ and $D_{R0}$) can be driven with differing voltage changes to generate a second sense signal in the same sense electrode. A measurement $\Delta S_2$ of the second sense signal can be acquired, and positional information $x_0$ for an input object can be determined from equation 5 using $\Delta S_2$ and the previously measured value $\Delta C$. Alternatively, in another embodiment, processing system 110 can drive one conductive routing trace (e.g. $D_{L0}$) with a constant voltage (e.g. 0 volts or ground) while driving the second conductive routing trace (e.g. $D_{R0}$) with a changing voltage. If the changing voltage is equal in magnitude to the voltage change $\delta V_0$ used to take the first measurement, then equation 6 reduces to equation 8:

$$\Delta S_2 = K\,x_0\,\delta C\,\delta V_0 \qquad \text{Equation 8}$$

Equation 8 gives $x_0$ from known or measured quantities by rearranging and substituting terms:

$$x_0 = \Delta S_2/\Delta S_1 \qquad \text{Equation 9}$$

In yet another embodiment, a first measurement $\Delta S_1$ can be obtained by holding $D_{L0}$ at a fixed voltage (e.g. 0 volts or ground) and driving $D_{R0}$ through a voltage change $\delta V_0$. Then a second measurement $\Delta S_2$ can be obtained by driving $D_{L0}$ through the same voltage change $\delta V_0$, and holding $D_{R0}$ at a fixed voltage (e.g. 0 volts or ground). In this case, the position information $x_0$ for the input object is given by equation 9:

$$x_0 = \Delta S_1/(\Delta S_1 + \Delta S_2) \qquad \text{Equation 10}$$

And the total change in measured capacitance $\Delta C$ due to the presence of the input object is given by equation 10:

$$\Delta C = K(\Delta S_1 + \Delta S_2)/\delta V_0 \qquad \text{Equation 11}$$

In the description given above, the driven voltages can in general be static voltages, step voltages, time-varying voltages, or other types of voltage waveforms. Note that these are only example methods of determining an input object's presence and position. The same information can be obtained by driving the voltages on $D_{L0}$ and $D_{R0}$ in many other ways in accordance with the general formulation described above. Further, in many of the described embodiments, while a sensor electrode may be described as being driven by processing system 110 or processing system 110 may be described as driving a sensor electrode, the sensor electrode may also be described as being electrically driven by processing system 110 or processing system 110 may be described as electrically driving a sensor electrode.

FIG. 2B shows another embodiment of sensor 108 of input device 100 of FIG. 1. Sensor 108B contains a second drive electrode $D_1$, coupled to processing system 110 via routing traces $D_{L1}$ and $D_{R1}$. In one embodiment drive electrode $D_0$ and drive electrode $D_1$ comprise a substantially similar resistive material. In another embodiment, drive electrode $D_0$ and drive electrode $D_1$ comprise substantially different resistive materials. In the embodiment of FIG. 2B, drive electrode $D_1$ can be driven with the same voltage waveforms and at the same time as drive electrode $D_0$, as described above with reference to FIG. 2A. Alternatively, each drive electrode can be driven independently and/or at different times.

Compared to the embodiment of FIG. 2A, in the embodiment shown in FIG. 2B the additional drive electrode may result in a stronger signal generated on sense electrode $S_0$ due to the addition of the capacitive coupling between the second drive electrode and the sense electrode. Further, the additional drive electrode $D_1$ may help to shield the sense electrode $S_0$ from nearby sources of electrical interference. Furthermore, if drive electrode $D_1$ is driven at a different time from drive electrode $D_0$, then the resulting two independent measurements on sense electrode $S_0$ may provide information indicative of the input object's location along axis 202.

Figure 2C:
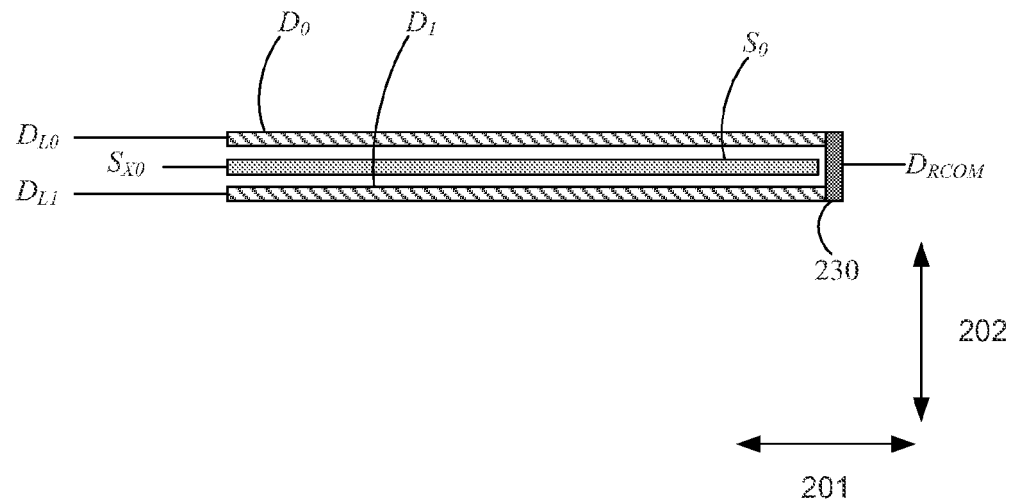
FIG. 2C illustrates a top view of a sensor 108C of an input device, according to an embodiment.
Figure 5:
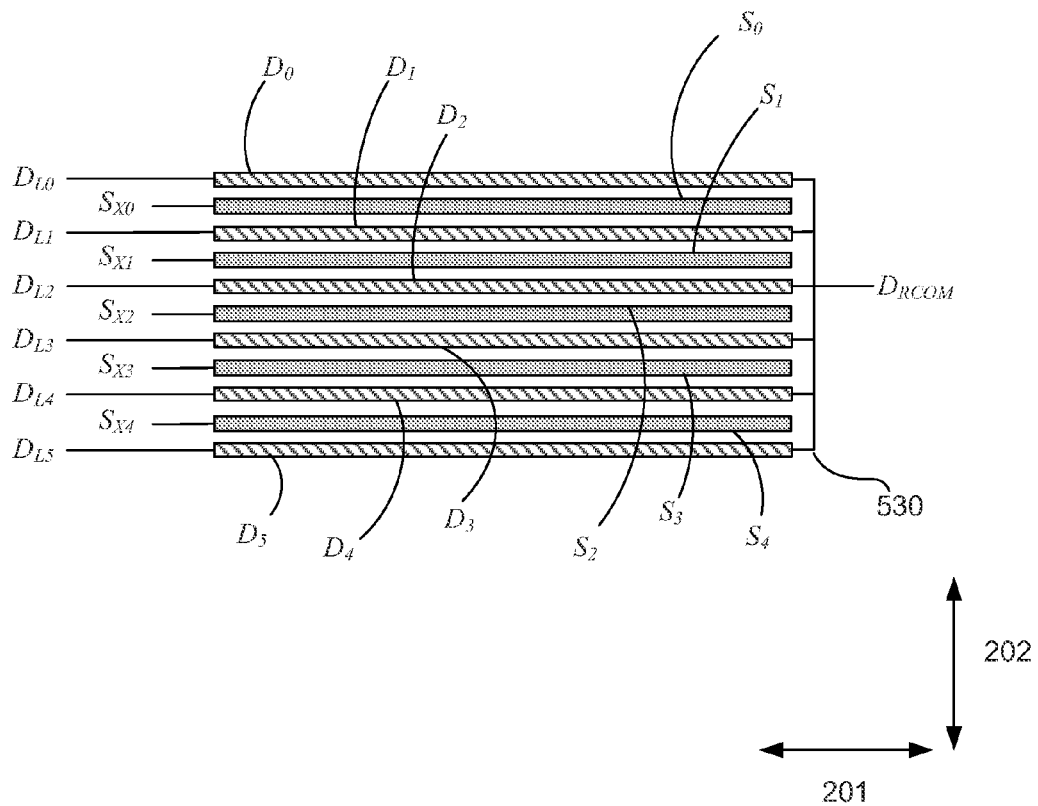
FIG. 5 illustrates a top view of a sensor 108H that is an alternative design to the sensor of FIG. 3B, in accordance with an embodiment.

FIG. 2C shows another embodiment of sensor 108 in input device 100 of FIG. 1. Sensor 108C contains a second drive electrode $D_1$, coupled to processing system 110 via routing trace $D_{L1}$. In this embodiment, conductive element 230, represented by the vertical bar on the right side of sensor 108C, electrically couples together one end of each drive electrode $D_0$ and $D_1$ such that the coupled ends of the drive electrodes may be commonly coupled to processing system 110 via the common routing trace $D_{RCOM}$. In some embodiments, where sensor 108C is substantially transparent, conductive element 230 might not be transparent since it may be located outside the sensor active area and would not be visibly obstructive to a display located beneath the sensor. In such an embodiment, conductive element 230 may be implemented with an opaque conductive material such as a screen-printed silver ink. In other embodiments, conductive element 230 is a set of routing traces that are coupled together (as is illustrated in FIG. 5) or may be made of the same or different resistive material as drive electrodes $D_0$ and $D_1$. Further, in some embodiments, conductive element 230 may be constructed from a transparent conductive material.

During operation, the embodiment of FIG. 2C puts a constraint on the ability of processing system 110 to drive each of the drive electrodes independently. In this case, since the right ends of both drive electrodes are coupled together, the rights ends will both be driven with the same voltage waveform via routing trace $D_{RCOM}$. Processing system 110 may still drive the left ends of each drive electrode independently. In this embodiment, the presence and position of an input object can be determined in the same way as described above with reference to FIGS. 2A and 2B. Compared with the embodiment of FIG. 2B, the embodiment of FIG. 2C reduces the number of conductive routing traces between the sensor and processing system 110.

Figure 2D:
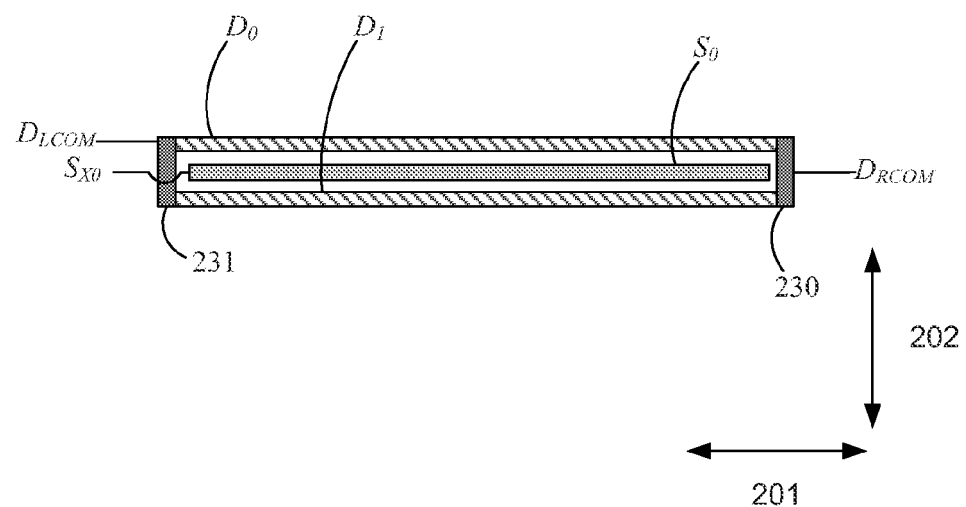
FIG. 2D illustrates a top view of a sensor 108D of an input device, according to an embodiment.

FIG. 2D shows yet another embodiment of sensor 108 of input device 100 of FIG. 1. In sensor 108D, two drive electrodes $D_0$ and $D_1$ are electrically coupled together at each end via conductive elements 231 and 230. The common ends of the drive electrodes are further coupled to processing system 110 via the common routing traces $D_{LCOM}$ and $D_{RCOM}$. Since both ends of each drive electrode are coupled together, each drive electrode will be driven with the same voltage waveforms. In this embodiment, the presence and position of an input object can be determined in the same way as described above with reference to FIGS. 2A and 2B. Compared with the embodiment of FIG. 2C, the embodiment of FIG. 2D further reduces the number of conductive routing traces between the sensor and processing system 110.

II. Dual-Axis Gradient Sensors

FIG. 3A illustrates a top view of a sensor 108E, according to an embodiment. Sensor 108E represents an example of a sensor 108, composed in input device 100 of FIG. 1. Sensor 108E can be viewed as an extension of sensors 108A or 108B, having additional drive and sense electrodes arrayed along a second axis 202. These additional electrodes allow the input device to determine two-dimensional positional information for input objects. In one embodiment, two-dimensional positional information may be determined along axis 201 and axis 202. As shown, sensor 108E includes a plurality of sensor electrodes ($D_0$-$D_5$ and $S_0$-$S_4$), some of which are designated as drive electrodes ($D_0$-$D_5$) and others of which are designated as sense electrodes ($S_0$-$S_4$). It is appreciated that other embodiments of sensor 108E can include a greater or lesser number of sensor electrodes. In one embodiment, conductive routing traces $D_{L0}$-$D_{L5}$ couple processing system 110 with the left ends of drive electrodes $D_0$-$D_5$, respectively, and conductive routing traces $D_{R0}$-$D_{R5}$ couple processing system 110 with the right ends of drive electrodes $D_0$-$D_5$, respectively. Further, conductive routing traces $S_{x0}$-$S_{x4}$ couple processing system 110 with sense electrodes $S_0$-$S_4$, respectively. In one embodiment, each conductive routing trace is coupled to an end of an associated drive electrode. For example, in one embodiment, conductive routing trace $D_{R0}$ is coupled to the right end of associated drive electrode $D_0$. In another embodiment, conductive routing trace $D_{L0}$ is coupled to the left end of associated drive electrode $D_0$. In a further embodiment, conductive routing traces $D_{L1}$ is coupled to the left end of associated drive electrode $D_1$.

As is illustrated, drive electrodes such as $D_1$ of sensor 108E are elongated along axis 201 (e.g., an X-axis of a Cartesian coordinate system). Sense electrodes such as $S_1$ of sensor 108E are disposed proximate to the drive electrodes. In one embodiment, sense electrodes such as $S_1$ are disposed substantially parallel to the drive electrodes. For example, sense electrodes $S_0$-$S_1$ are parallel with drive electrodes $D_0$-$D_5$.

In some embodiments, sensor 108E is constructed as a single-layer sensor, meaning that drive electrodes $D_0$-$D_5$ and sense electrodes $S_0$-$S_4$ are disposed in the same layer on substrate 102. In other embodiments, drive. electrodes $D_0$-$D_5$ and sense electrodes $S_0$-$S_4$ may be disposed in different layers on substrate 102, or on different substrates, without altering the general operation of sensor 108E.

Sensor 108E can be operated as an extension of sensors 108A or 108B, following the same principles described above with reference to FIG. 2A, and as further described below, and in conjunction with flow diagram 900 (FIGS. 9A and 9B). Drive electrodes $D_0$-$D_5$ can be driven one-at-a-time, in various groupings, or all at the same time. Likewise, the sense signals on sense electrodes $S_0$-$S_4$ can be measured one-at-time, in various groupings, or all together. As described with reference to FIG. 2A above, the measurement of the sense signal on any sense electrode (e.g. $S_1$) can be used to determine the presence of an input object in proximity to it, as well as the position of the input object along its length (along axis 201).

Furthermore, the position of an input object along the second axis 202 can be determined from the measurements of the sense signals on a plurality of the sense electrodes $S_0$-$S_4$. For example, the sense electrode nearest the input object may have a correspondingly large change in its measured sense signal, while sense electrodes far away from the input object may have little or no change in their measured sense signals. In one embodiment, the position of an input object along axis 202 can be determined by finding which sense electrode has the largest measured sense signal change. In other embodiments, the position of an input object along axis 202 may be determined from the set of measured changes in capacitive coupling by using a peak detection algorithm, or a peak fitting algorithm, or something similar.

Figure 3B:
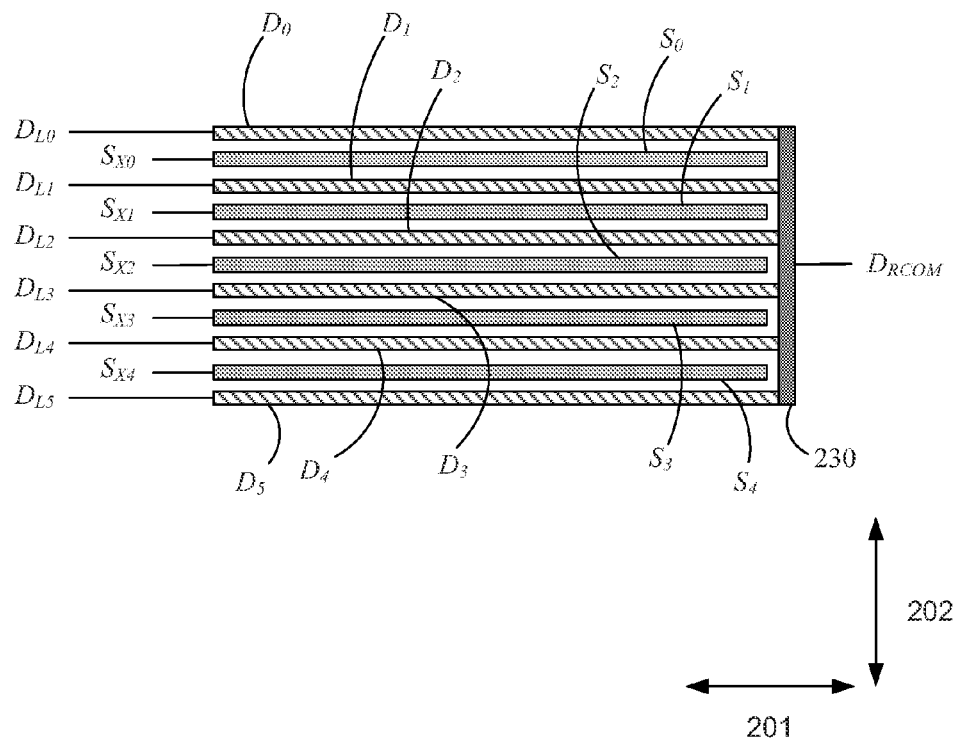
FIG. 3B illustrates a top view of a sensor 108F of an input device, according to an embodiment.

FIG. 3B illustrates a top view of a sensor 108F, according to an embodiment. Sensor 108F represents an example of a sensor 108, composed in input device 100 of FIG. 1. As in the embodiment of FIG. 2C, conductive element 230 electrically couples together the right ends of each drive electrode $D_0$-$D_5$ such that the right ends of the drive electrodes may be commonly coupled to processing system 110 via the common conductive routing trace $D_{RCOM}$.

During operation, since the right ends of all drive electrodes are coupled together, the rights ends will all be driven with the same voltage waveform via routing trace $D_{RCOM}$. However, the sense electrodes $S_0$-$S_4$ are not coupled together, and therefore the sense signals are independent and can be independently measured by processing system 110. Therefore, in this embodiment, positional information, including the presence and position of an input object, can be determined in the same way as described above with reference to FIG. 3A (and with further reference to FIGS. 2A and 2B). Compared with the embodiment of FIG. 3A, the embodiment of FIG. 3B reduces the number of conductive routing traces between the sensor and processing system 110.

Figure 3C:
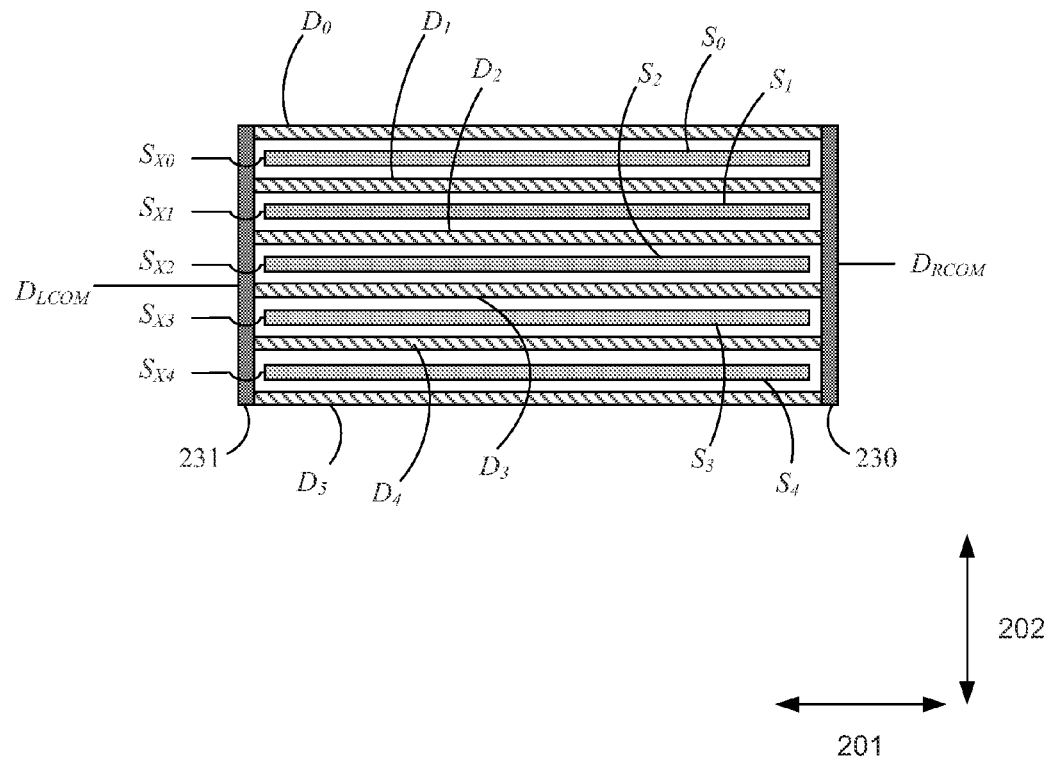
FIG. 3C illustrates a top view of a sensor 108G of an input device, according to an embodiment.

FIG. 3C illustrates a top view of a sensor 108G, according to another embodiment. Sensor 108G represents an example of a sensor 108, composed in input device 100 of FIG. 1. As in the embodiment of FIG. 2D, conductive element 230 electrically couples together the right ends of each drive electrode $D_0$-$D_5$ such that the right ends of the drive electrodes may be commonly coupled to processing system 110 via the common routing trace $D_{RCOM}$. Further, conductive element 231 electrically couples together the left ends of each drive electrode $D_0$-$D_5$ such that the left ends of the drive electrodes may be commonly coupled to processing system 110 via the common routing trace $D_{LCOM}$.

During operation, since both ends of each drive electrode are coupled together, all the drive electrodes will be driven with the same voltage waveforms via routing traces $D_{LCOM}$ and $D_{RCOM}$. However, the sense electrodes $S_0$-$S_4$ are not coupled together, and therefore the sense signals will be independent and can be independently measured. Positional information, including the presence and position of an input object, can be determined in the same way as described above with reference to FIG. 3A (and with further reference to FIGS. 2A and 2B). Compared with the embodiment of FIG. 3B, the embodiment of FIG. 3C further reduces the number of conductive routing traces between the sensor and processing system 110.

Figure 4A:
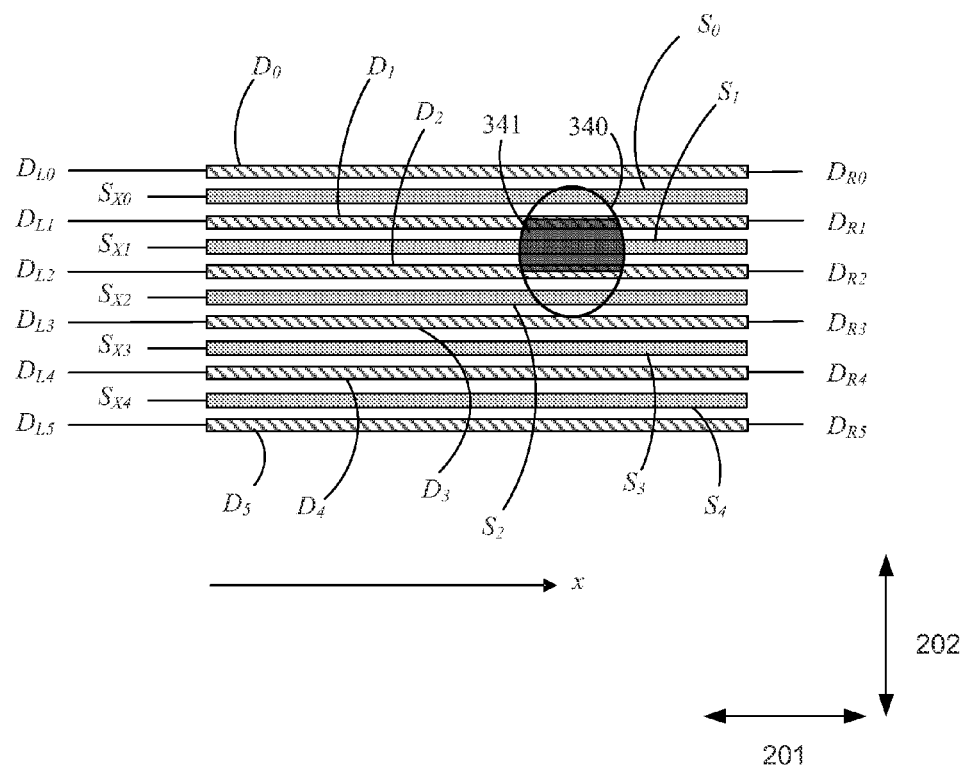
FIG. 4A shows the outline of an input object on the sensor of FIG. 3A according to one embodiment.

FIG. 4A shows the outline 340 of an input object on sensor 108E, according to one embodiment. As can be seen, the input object is approximately centered over sense electrode $S_1$ along axis 202, at a distance x from the left edge of the sensor 108E along axis 201. The outline 340 represents the region over which the input object influences the capacitive couplings between the drive electrodes and the sense electrodes. Shaded area 341 shows the region in which the input object influences the capacitive coupling between sense electrode $S_1$ and drive electrodes $D_1$ and $D_2$. The outline of the input object is widest in this area, and therefore the largest change in the capacitive coupling will be measured on sense electrode $S_1$. Smaller changes in capacitive coupling will be measured on sense electrodes $S_0$ and $S_2$, and substantially no changes will be measured on the remaining sense electrodes. As described above, in one embodiment, the position along axis 202 of an input object (e.g., the Y-component of the position) can be computed from the set of measured changes in capacitive coupling by using a peak detection algorithm, or a peak fitting algorithm, or something similar.

Figure 4B:
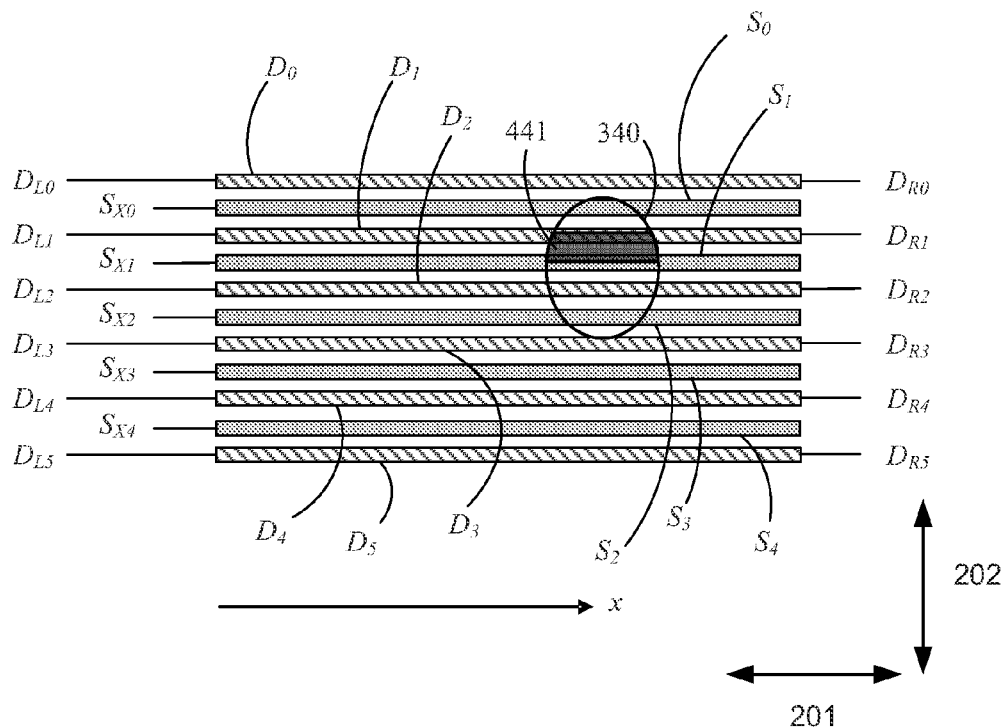
FIG. 4B shows a reduced region of influence of an input object, according to an embodiment.

In some embodiments, one or more techniques can be employed to enhance position resolution along axis 202. For example, FIG. 4B shows how, in one embodiment, the region of influence 441 measured by sense electrode $S_1$ can be reduced, as compared to region 341, by driving only drive electrode $D_1$. Subsequently, the other portion of region 341 can be measured by driving only drive electrode $D_2$. In this manner, two separate measurements can be taken on sense electrode $S_1$, each representing a different region of influence. The result can be an approximate doubling of the position resolution along axis 202.

It is appreciated that, while driving with one drive electrode, the electrical signal on the two sense electrodes on either side of it can be measured simultaneously by processing system 110. Moreover, in other embodiments, since it may already known from earlier measurements which sense electrodes are influenced by input object 340, a high-resolution measurement can be restricted to just the relevant drive and sense electrodes near input object 340 to save time and power. In one embodiment, the effective resolution along axis 202 is effectively doubled. In another embodiment, this enhanced resolution allows a reduction in the number of sensor electrodes by about half, and thus a reduction in the number of conductive routing traces 104 between the sensor and processing system 110. In yet another embodiment, this enhanced resolution allows for an increased sensor pitch and thus a larger sensor, without increasing the number of sensor electrodes or conductive routing traces 104.

FIG. 5 illustrates a top view of a sensor 108H that is an alternative design, in accordance with another embodiment. As illustrated in FIG. 5, in sensor 108H conductive element 230 of sensor 108F (in FIG. 3B) has been replaced by conductive element 530, comprising a set of conductive traces that couple together the right ends of drive electrodes $D_0$-$D_5$. Sensor 108H operates in the manner previously described in conjunction with sensor 108F. In various embodiments, the conductive element 530 can couple the drive electrode ends together near the sensor, near the processing system 110, or anywhere in between.

Figure 6:
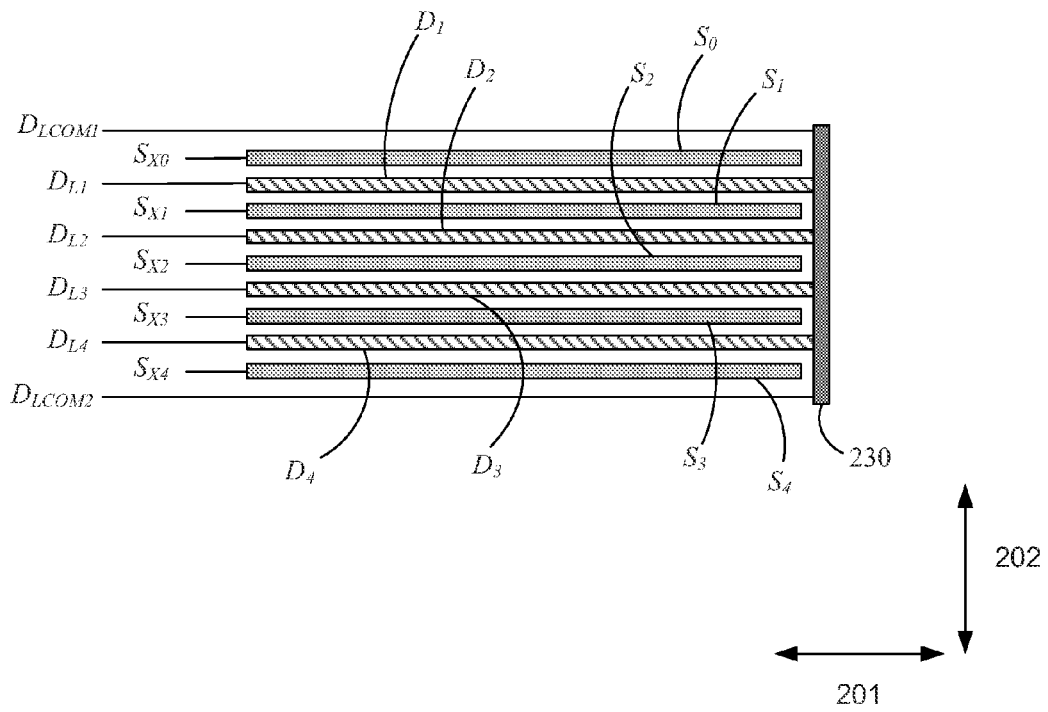
FIG. 6 illustrates a top view of a sensor 108I that is an alternative design to the sensor of FIG. 3B, in accordance with an embodiment.

FIG. 6 illustrates a top view of a sensor 108I that is an alternative design, in accordance with another embodiment. In sensor 108I the $D_{RCOM}$ trace is routed along the edges of the sensor so that all of the conductive routing traces come off a single side (the left side as illustrated) of sensor 108I. Routing the conductive routing traces off a single side can simplify system integration and reduce cost by decreasing the number and/or length of cables between the sensor and processing system 110. FIG. 6 shows $D_{RCOM}$ routed along both the top and bottom edges of the sensor, however, in some embodiments a single conductive routing trace along either the top or the bottom edge would be sufficient. In the embodiment of FIG. 6 there is a small inactive border region along the top and/or bottom edges of the sensor where the $D_{RCOM}$ traces are routed. In one embodiment, the alternative constructions 108H and 108I may be combined.

III. Dual-Axis Gradient Sensor Configured for Single-Sided Excitation

Figure 7A:
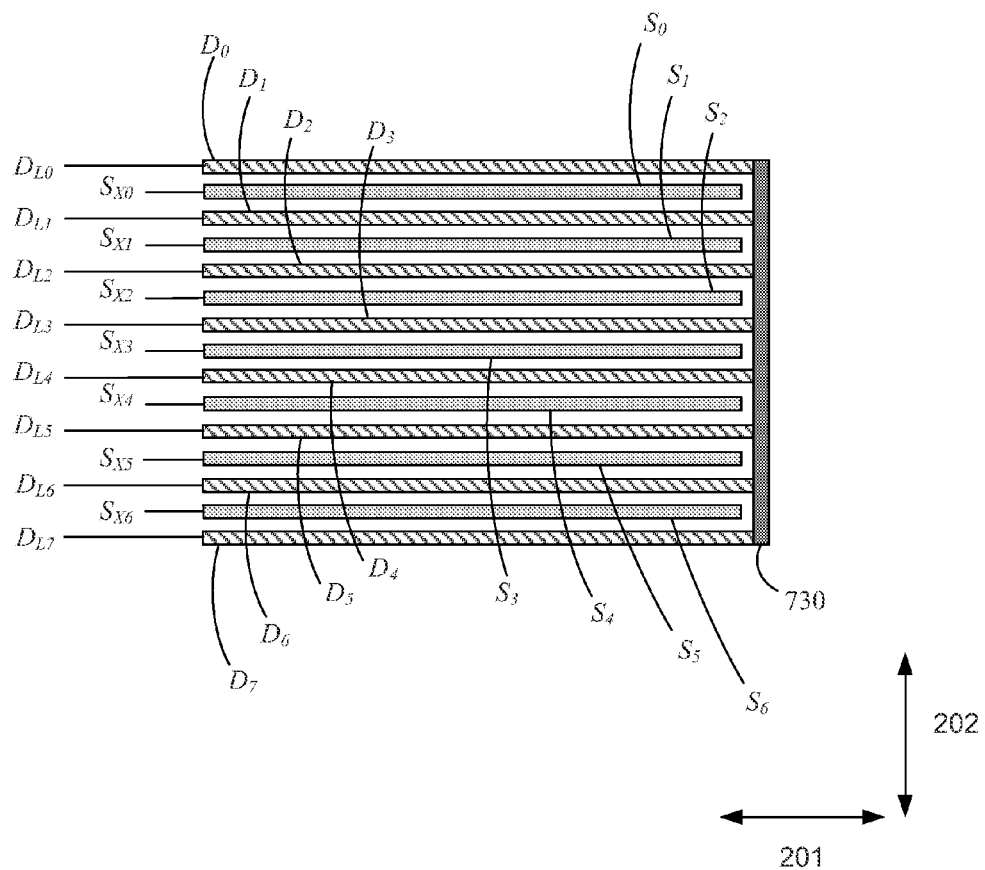
FIG. 7A illustrates a top view of a sensor 108J of an input device, according to an embodiment.

FIG. 7A illustrates a top view of a sensor 108J, which is a further embodiment of sensor 108 in input device 100. As illustrated, sensor 108J includes a plurality of sensor electrodes ($D_0$-$D_7$ and $S_0$-$S_6$), some of which are designated as drive electrodes ($D_0$-$D_7$) and others of which are designated as sense electrodes ($S_0$-$S_6$). It is appreciated that other embodiments of sensor 108J can included a greater or lesser number of sensor electrodes. In FIG. 7A, conductive routing traces $D_{L0}$-$D_{L7}$ couple processing system 110 with drive electrodes $D_0$-$D_7$, respectively, and conductive routing traces $S_{x0}$-$S_{x6}$ couple processing system 110 with sense electrodes $S_0$-$S_6$, respectively.

As is illustrated, drive electrodes such as $D_1$ of sensor 108J are elongated along axis 201 (e.g., an X-axis of a Cartesian coordinate system). Sense electrodes such as $S_1$ of sensor 108J are disposed proximate to and substantially parallel to the drive electrodes. For example, sense electrodes $S_0$-$S_6$ are parallel to drive electrodes $D_0$-$D_7$. Furthermore, conductive element 730 electrically couples together the right ends of each drive electrode $D_0$-$D_7$. Sensor 108J has similarity to sensor 108F in FIG. 3B. However, some differences in construction between sensor 108J and sensor 108F are described with respect to FIGS. 7A-7C and 8. Namely, in sensor 108J there is no common routing trace $D_{RCOM}$ coupling the right ends of the drive electrodes or conductive element 730 with processing system 110. Thus, the design illustrated in FIG. 7A eliminates the need for any border wires while still allowing the conductive routing traces to come off a single side of the sensor. In general, sensor 108J operates in the same manner as sensors 108F and 108H, except that processing system 110 may employ different driving sequences to the drive electrodes of sensor 108J, and may apply different computations to the measured sense signals. It is appreciated that the sensor electrodes ($D_0$-$D_7$ and $S_0$-$S_6$) and conductive element 730 may all be disposed in the same layer on a substrate, such as substrate 102, however this is not required. In some embodiments, conductive element 730 and drive electrodes $D_0$-$D_7$ form a comb-shaped electrode, where conductive element 730 is the spine of the comb-shaped electrode and the drive electrodes $D_0$-$D_7$ are the tangs.

Figure 8:
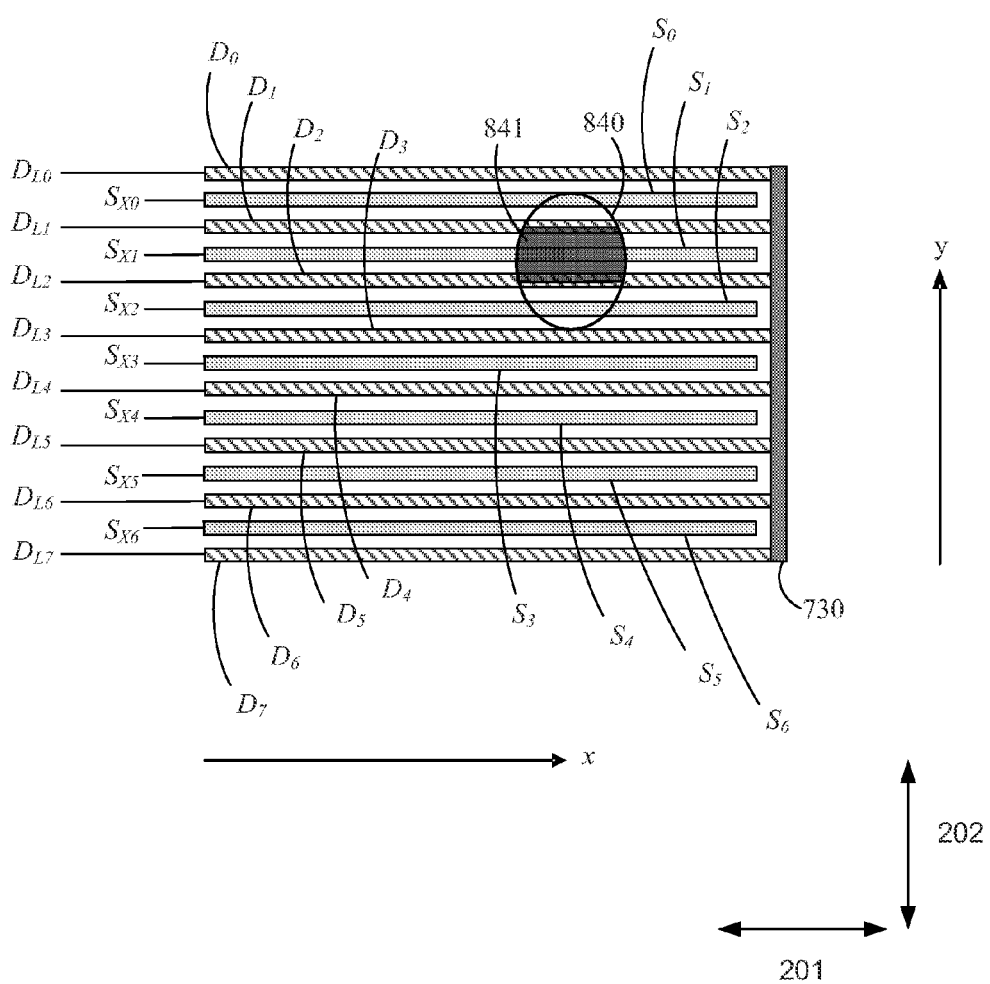
FIG. 8 shows the outline of an input object on the sensor of FIG. 7A, according to one embodiment.

FIG. 8 shows the outline of an input object 840 on sensor 108J, according to one embodiment. Shaded area 841 shows the region in which input object 840 influences the capacitive coupling between sense electrode $S_1$ and drive electrodes $D_1$ and $D_2$.

In some embodiments, to detect the presence of input object 840 on the sensor 108J and/or its position along axis 202, processing system 110 drives all the routing traces $D_{L0}$-$D_{L7}$ with a common voltage waveform. Processing system 110 can then measure the sense signal on each sense electrode to determine a change in the capacitive coupling between each sense electrode and nearby drive electrodes. In one embodiment, from these measurements the presence of an input object and its position along axis 202 (e.g., the Y-component of the position) can be determined using a peak detection algorithm, or a peak fitting algorithm, or something similar.

In some embodiments, to measure the position of input object 840 along axis 201, processing system 110 acquires at least two sets of measurements. To obtain the first set of measurements, processing system 110 drives a voltage waveform on conductive routing traces $D_{L0}$, $D_{L1}$, $D_{L2}$, $D_{L3}$ and drives a constant voltage or a different voltage waveform on conductive routing traces $D_{L4}$, $D_{L5}$, $D_{L6}$ and $D_{L7}$. This will create changing voltage gradients on the drive electrodes from left to right along axis 201. For example, the voltage gradient from left to right on drive electrodes $D_0$, $D_1$, $D_2$ and $D_3$ might decrease, while the voltage gradient from left to right on the drive electrodes $D_4$, $D_5$, $D_6$ and $D_7$ might increase. In this embodiment, the changes in voltage gradient along each of the two sets of drive electrodes are opposite in sign because the current flow through the two sets of drive electrodes will be opposite in direction. The changes in voltage gradient generate first sense signals on each sense electrode, which can be measured by processing system 110. Next, processing system 110 drives the same two groups of conductive routing traces ($D_{L0}$, $D_{L1}$, $D_{L2}$, $D_{L3}$ and $D_{L4}$, $D_{L5}$, $D_{L6}$ and $D_{L7}$) with differing voltage changes, generating second sense signals on each sense electrode, which can also be measured by processing system 110. Since the changes in voltage gradient are known for each drive electrode, position information for an input object can be determined as described above with reference to FIG. 3A (and with further reference to FIGS. 2A and 2B).

With the first set of measurements described above, and in relation to FIG. 8, sense electrode $S_3$ lies along a boundary between two sets of drive electrodes having changing voltage gradients of opposite sign. An input object in this area may not be reliably detected because the effects of the opposing changes in voltage gradient will tend to cancel. To reliably detect input objects in this area, the boundary between opposing changes in voltage gradient can be shifted by taking a second set of measurements with a different grouping of drive electrodes. For example, conductive routing traces $D_{L0}$, $D_{L1}$, $D_{L6}$, $D_{L7}$ may be driven with one voltage waveform, and conductive routing traces $D_{L2}$, $D_{L3}$, $D_{L4}$, $D_{L5}$ may be driven, with a constant voltage or a second voltage waveform. This grouping of conductive routing traces creates voltage gradient boundaries along sense electrodes $S_1$ and $S_5$. Since sense electrode $S_3$ no longer lies along a voltage gradient boundary, an input object near sense electrode $S_3$ can be reliably detected. In other embodiments, the conductive routing traces can be driven in other groupings. In yet other embodiments, the groupings may have differing numbers of conductive routing traces.

In another embodiment, a measurement acquired by processing system 110 with all drive electrodes driven with a common voltage waveform may be used for both detection of the presence of an input object and for determination of the position of the input object along axis 202. Once the position of the input object along axis 202 is known, then the drive electrodes can be grouped so that there is no voltage gradient boundary near the input object, and the position of the input object along axis 201 can be determined with a single set of measurements.

In other embodiments, the voltage gradient boundary may be shifted across sensor 108J. For example, in one embodiment the voltage gradient boundary may be cyclically shifted from sense electrode $S_0$ to sense electrode $S_6$. In this case, the first grouping of conductive routing traces comprises a first group consisting of $D_{L0}$ and a second group consisting of $D_{L1}$-$D_{L7}$, thereby placing the voltage gradient boundary along sense electrode $S_0$. To cyclically shift the voltage gradient boundary through sensor 108J, the second grouping comprises a first group consisting of $D_{L0}$, $D_{L1}$ and a second group consisting of $D_{L2}$-$D_{L7}$, thereby placing the voltage gradient boundary along sense electrode $S_1$. The shifting of the groupings continues through a seventh grouping, where the seventh grouping comprises a first group consisting of $D_{L0}$-$D_{L6}$ and a second group consisting of $D_{L7}$, thereby placing the voltage gradient boundary along sense electrode $S_6$. In another embodiment, the voltage gradient boundary may be cyclically shifted in the opposite direction from sense electrode $S_6$ to sense electrode $S_0$. Further, other methods of cyclically shifting the voltage gradient boundary through sensor 108J are also possible. By shifting the voltage gradient boundary using any of the above described methods, input objects can be reliably detected at any location on the sensor.

Figure 7B:
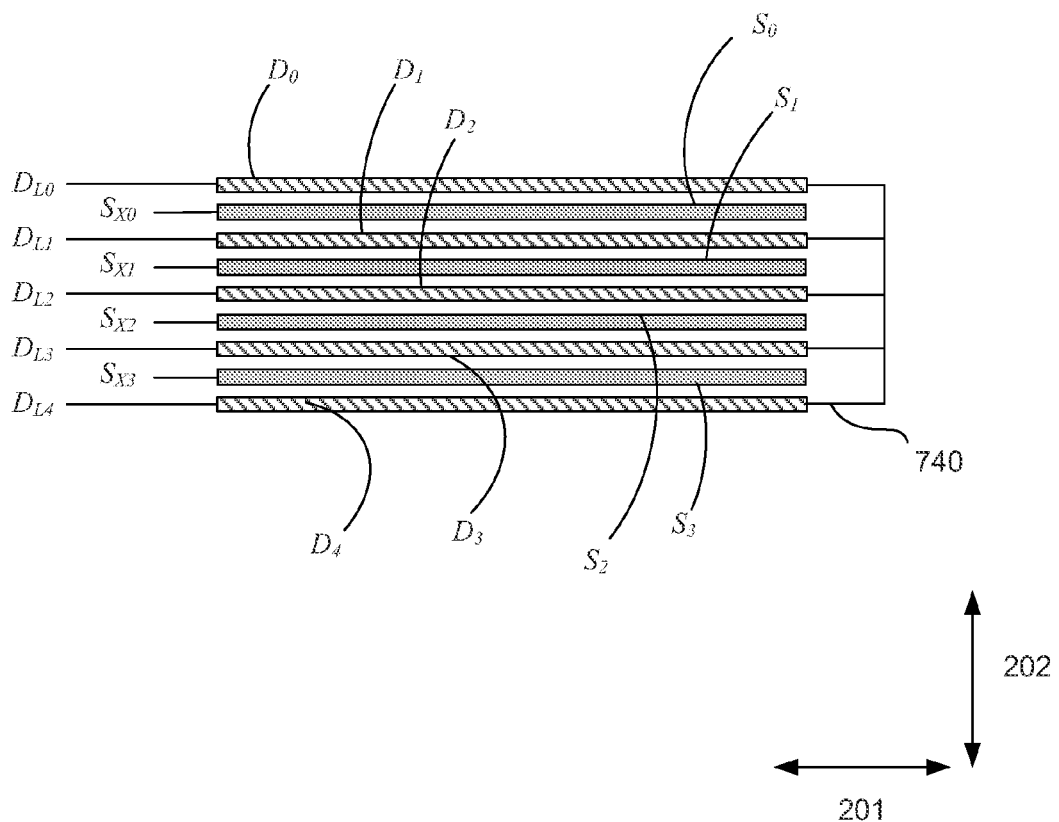
FIG. 7B illustrates a top view of a sensor 108K of an input device, according to an embodiment.

Turning now to FIG. 7B, a top view of a sensor 108K is illustrated, according to another embodiment. Sensor 108K represents an example of a sensor 108, composed in input device 100 of FIG. 1. As in the embodiment of FIG. 7A, the right ends of each drive electrode of sensor 108K are electrically coupled together. However, conductive element 730 is replaced with conductive element 740, comprising a plurality of conductive traces.

Figure 7C:
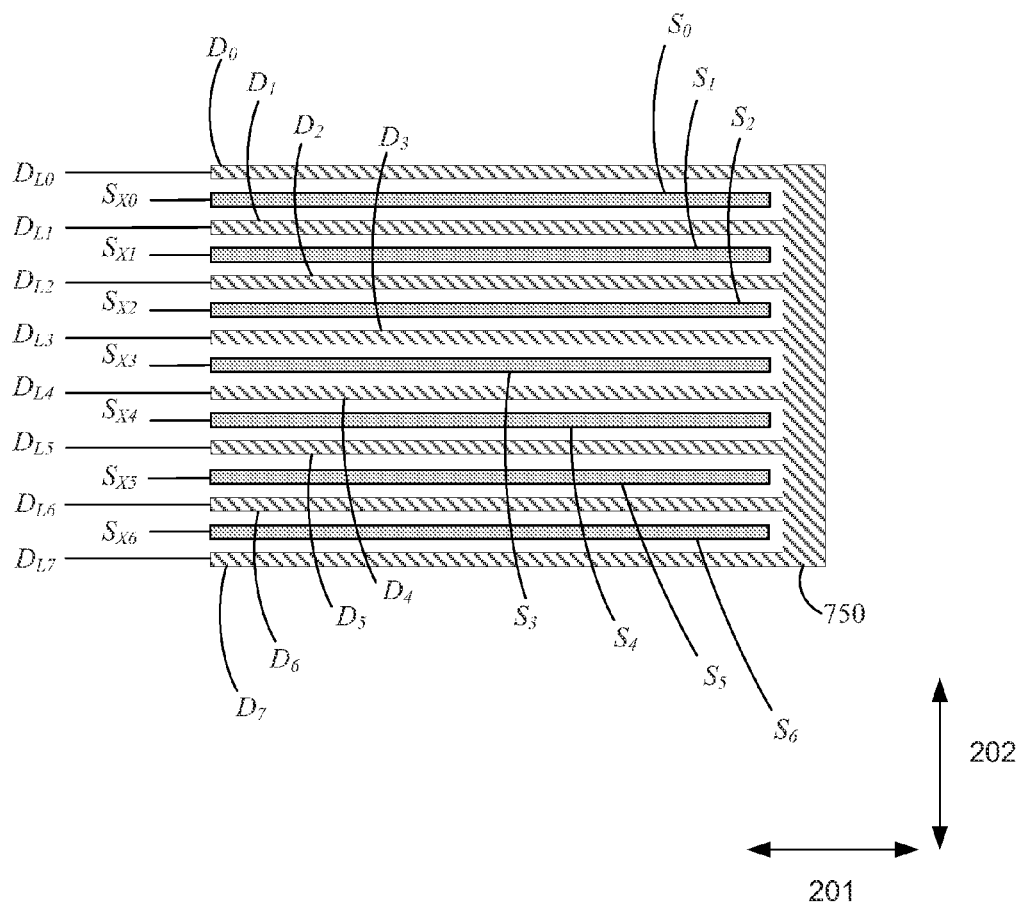
FIG. 7C illustrates a top view of a sensor 108L of an input device, according to an embodiment.

FIG. 7C illustrates a top view of a sensor 108L, according to another embodiment. Sensor 108L represents an example of a sensor 108, composed in input device 100 of FIG. 1. As in the embodiment of FIG. 7A, the right ends of each drive electrode of sensor 108L are electrically coupled together. However, conductive element 730 of FIG. 7A is replaced with conductive element 750 in FIG. 7C. Conductive element 750 may be constructed from the same material as drive electrodes $D_0$-$D_7$ or from a different material. In any case, if conductive element 750 has significant resistivity, it will create voltage drops between the right ends of the drive electrodes when they are driven as described above. Based on the known geometry and resistivity of the drive electrodes and conductive element 750, these voltage drops can be calculated using well-known circuit theory. Based on the calculated voltage drops, the perturbations in the voltage gradient changes due the resistance of conductive element 750 can be computed, and the desired positional information for input objects can still be easily determined. If the resistivity of the drive electrodes and conductive element 750 is not known in advance, then the voltage drops can be measured directly.

It is appreciated, that the above embodiments are meant to be non-limiting and that in other embodiments, alternate sequences of driving sensor electrodes may be used with sensor 108J. Further, in various embodiments, there may be more than two groups of drive electrodes during operation. In other embodiments, a drive electrode can be absent from the groups in a grouping. In yet further embodiments, the drive electrodes within the groups of a grouping may be determined using a random or pseudo random method.

EXAMPLE METHODS OF OPERATION

The following discussion sets forth in detail example methods of operation of embodiments of the present invention. With reference to FIGS. 9A and 9B, flow diagrams 900A and 900B illustrate example procedures used by various embodiments. Flow diagrams 900A and 900B include some procedures that, in various embodiments, can be carried out by a processor under the control of computer-readable and computer-executable instructions as described above. In this fashion, all or part of flow diagrams 900A and 900B can be implemented using a computer or processing system, such as processing system 110, in various embodiments. Although specific procedures are disclosed in flow diagrams 900A and 900B, such procedures are examples. That is, some embodiments are well suited to performing various other procedures or variations of the procedures recited in flow diagrams 900A and 900B and described below. Likewise, in some embodiments, the procedures in flow diagrams 900A and 900B (along with those described below) may be performed in an order different than presented and/or not all of the procedures described in flow diagrams 900A and 900B may be performed.

FIGS. 9A and 9B illustrate flow diagrams for some example methods of position sensing, according to various embodiments of the present invention. Flow diagrams 900A and 900B also describe methods of using input device 100 and processing system 110 with one or more of the sensors 108 that are described herein, according to various embodiments. Procedures of flow diagrams 900A and 900B are described below, with reference to elements of FIGS. 1-8.

At 910 of flow diagram 900A, first and second ends of a drive electrode are electrically driven to cause a change in a voltage gradient along a length of the drive electrode, thus generating a first electrical signal in a sense electrode. In some embodiments, the first end is driven with a varying voltage, while the second end is held at a constant voltage or driven with a different varying voltage. In some embodiments, the varying voltages may be different in amplitude or polarity. With reference to sensor 108E in FIG. 3A, in one embodiment, flow diagram step 910 can comprise processing system 110 driving the right end of $D_1$ with a voltage waveform and driving the left end of $D_1$ with a different voltage waveform or a constant voltage. Techniques for accomplishing this have been described with reference at least to FIGS. 1-8. Further, the methods described above generate a first electrical signal in a sense electrode.

At 920 of flow diagram 900A, in some embodiments, a first measurement of the first electrical signal is acquired. In some embodiments, processing system 110 acquires this measurement. Following the previous example centered on sensor 108E, processing system 110 can acquire the first measurement from sense electrode $S_1$ in the manner previously described herein.

At 930 of flow diagram 900A, in some embodiments positional information is determined along the length of the first drive electrode based upon the first measurement. The positional information is related to an input object. Following the previous example that is centered on sensor 108E, in some embodiments processing system 110 determines an X-position along the length of drive electrode $D_1$ in the manner described in conjunction with one or more of Equations 1-11. Other techniques for determining such positional information have also been discussed herein, and in the interest of brevity and clarity, reference is made thereto. In some embodiments, processing system 110 can determine positional information in two dimensions, at least partially based upon the first measurement, the positional information again being related to an input object. Determination of two-dimensional position information has been previously described with reference to FIG. 3A (and with further reference to FIGS. 2A and 2B).

Referring now to flow diagram 900B, flow diagram 900B comprises 910 and 920 of flow diagram 900A and as such, 910 and 920 are described above in relation to FIG. 9A. At 940 of flow diagram 9006, in some embodiments the method further comprises electrically driving at least one of the first and second ends of the drive electrode to generate a second electrical signal in the sense electrode. In some embodiments, one end is driven with a voltage waveform while the other end is electrically floating (i.e. at a high impendence). In other embodiments, one end is held at a constant voltage, while the other end is driven with a voltage waveform. In yet other embodiments, the first end is driven with a voltage waveform and the second end is driven with a different voltage waveform. It is appreciated that step 940 of flow diagram 900B might not cause a change in the voltage gradient along the length of the drive electrode, or it may cause a different change in the voltage gradient from the change in voltage gradient caused by step 910 of flow diagram 9006.

With continued reference to FIG. 9B, at 950 of flow diagram 900B, in some embodiments a second measurement is acquired, the second measurement being of the second electrical signal. In some embodiments, processing system 110 measures the second electrical signal in the manner previously described herein.

At 960 of flow diagram 900B, in some embodiments positional information along the length of the drive electrode is determined based upon the first and second measurements. The positional information is related to an input object. Following the previous example that is centered on sensor 108E, in some embodiments processing system 110 determines an X-position along the length of drive electrode $D_1$ in the manner described in conjunction with one or more of Equations 1-11. Other techniques for determining such positional information have also been discussed herein, and in the interest of brevity and clarity, reference is made thereto. In some embodiments, processing system 110 can determine positional information in two dimensions, at least partially based upon the first and second measurements, the positional information again being related to an input object. Determination of two-dimensional position information has been previously described with reference to FIG. 3A (and with further reference to FIGS. 2A and 2B).

For matters of convenience only, in any of the previous descriptions a first drive electrode, a second drive electrode, and a first sense electrode may be referred to as drive electrode $D_0$, drive electrode $D_1$, and sense electrode $S_0$, respectively. Further, a plurality of drive electrodes, a plurality of sense electrodes, and a plurality of conductive routing traces may be referred to as drive electrodes $D_0$-$D_5$, sense electrodes $S_0$-$S_4$, and conductive routing traces $D_{L0}$-$D_{L5}$ or $D_{R0}$-$D_{R5}$, respectively. It is understood that in some embodiments the plurality of drive electrodes, plurality of sense electrodes and plurality of conductive routing traces may comprise more or fewer drive electrodes, sense electrodes, and conductive routing traces, respectively. In the preceding embodiments, where two drive electrodes are described, the terms "first drive electrode" and "second drive electrode" may refer to any two separate drive electrodes. Furthermore, where more than one sense electrode is described, the term "first sense electrode" may refer to any sense electrode.

The foregoing descriptions of specific embodiments have been presented for purposes of illustration and description. They are not intended to be exhaustive or to limit the presented technology to the precise forms disclosed, and obviously many modifications and variations are possible in light of the above teaching. The embodiments were chosen and described in order to best explain the principles of the presented technology and its practical application, to thereby enable others skilled in the art to best utilize the presented technology and various embodiments with various modifications as are suited to the particular use contemplated.

What is claimed is:

1. An input device comprising:
a first drive electrode;
a first sense electrode disposed proximate to said first drive electrode; and
a processing system coupled with said first drive electrode and said first sense electrode, said processing system configured for:
electrically driving a first end of said first drive electrode and electrically driving a second end of said first drive electrode to cause a change in a voltage gradient along a length of said first drive electrode, wherein said change in said voltage gradient generates a first electrical signal on said first sense electrode;
acquiring a first measurement of said first electrical signal; and
determining positional information along said length of said first drive electrode based upon said first measurement, said positional information related to an input object.

2. The input device of claim 1, further comprising:
a second drive electrode, said second drive electrode disposed in parallel with said first drive electrode such that said first sense electrode is arranged between said first drive electrode and said second drive electrode.

3. The input device of claim 1, wherein said processing system is further configured for:
electrically driving said first drive electrode to generate a second electrical signal on said first sense electrode; and
acquiring a second measurement, said second measurement being of said second electrical signal.

4. The input device of claim 3, wherein said processing system is further configured for determining said positional information based also upon said second measurement.

5. The input device of claim 3, wherein said processing system is further configured for:
determining two-dimensional positional information for said input object based upon said first and said second measurements.

6. The input device of claim 3, wherein said electrically driving said first drive electrode to generate a second electrical signal on said first sense electrode causes a second change in said voltage gradient.

7. The input device of claim 1, wherein said first drive electrode and said first sense electrode are disposed in a single layer on a common substrate.

8. The input device of claim 1 further comprising:
a second sense electrode, wherein said second sense electrode is proximate to said first drive electrode, wherein said processing system is coupled with said second sense electrode, and wherein said second sense electrode is not coupled to said first sense electrode.

9. The input device of claim 1 further comprising:
a second sense electrode, wherein said second sense electrode is proximate to said first drive electrode, wherein said processing system is coupled with said second sense electrode, wherein said change in said voltage gradient generates a second electrical signal on said second sense electrode and wherein said first electrical signal and second electrical signal are independent.

10. The input device of claim 9, wherein the processing system is further configured to:
acquire a second measurement of said second electrical signal, wherein said first measurement and said second measurement are independent.

11. The input device of claim 9, wherein the processing system is further configured to:
acquire a second measurement of said second electrical signal, wherein said processing system simultaneously acquires said second measurement and said first measurement.

12. A method of sensing, said method comprising:
electrically driving a first end of a first drive electrode and electrically driving a second end of said first drive electrode to cause a change in a voltage gradient along a length of said first drive electrode, wherein said change in said voltage gradient generates a first electrical signal on a first sense electrode;
acquiring a first measurement of said first electrical signal; and
determining positional information along said length of said first drive electrode based upon said first measurement, said positional information related to an input object.

13. The method as recited in claim 12, further comprising:
electrically driving said first drive electrode to generate a second electrical signal on said first sense electrode; and
acquiring a second measurement, said second measurement being of said second electrical signal.

14. The method as recited in claim 13, further comprising:
determining said positional information based at least in part upon said second measurement.

15. The method as recited in claim 13, further comprising:
determining two-dimensional positional information for said input object based upon said first and said second measurements.

16. The method as recited in claim 13 wherein said electrically driving said first drive electrode to generate a second electrical signal on said first sense electrode causes a second change in said voltage gradient.

17. The method as recited in claim 12, wherein said change in said voltage gradient generates a second electrical signal on a second sense electrode, wherein said first electrical signal and said second electrical signal are independent.

18. The method of claim 17 further comprising:
acquiring a second measurement of said second electrical signal, wherein said first measurement and said second measurement are independent.

19. The method of claim 17 further comprising:
acquiring a second measurement of said second electrical signal, wherein said first measurement and said second measurement are simultaneously acquired.

20. A processing system configured to:
electrically drive a first end of a drive electrode and electrically drive a second end of said drive electrode to cause a change in a voltage gradient along a length of said drive electrode, wherein said change in said voltage gradient generates a first electrical signal on a sense electrode;

acquire a first measurement of said first electrical signal; and determine positional information along said length of said drive electrode based upon said first measurement, said positional information related to an input object.

21. The processing system of claim 20 further configured to:

electrically drive said drive electrode to generate a second electrical signal on said sense electrode; and acquire a second measurement, said second measurement being of said second electrical signal.

22. The processing system of claim 21 further configured to:

determine said positional information based at least in part upon said second measurement.

23. The processing system of claim 21 further configured to:

determine two-dimensional positional information for said input object based upon said first and said second measurements.

24. The processing system of claim 20, wherein said electrically driving said drive electrode to generate a second electrical signal on said sense electrode causes a second change in said voltage gradient.

25. The processing system of claim 20, wherein said change in said voltage gradient generates a second electrical signal on a second sense electrode, and wherein said first electrical signal and said second electrical signal are independent.

26. The processing system of claim 25 further configured to:

acquire a second measurement of said second electrical signal, wherein said first measurement and said second measurement are independent.

27. The processing system of claim 25 further configured to:

acquire a second measurement of said second electrical signal, wherein said first measurement and said second measurement are simultaneously acquired.

* * * * *